United States Patent
Koizumi et al.

(10) Patent No.: US 12,387,743 B2
(45) Date of Patent: Aug. 12, 2025

(54) ABNORMALITY ESTIMATION DEVICE, ABNORMALITY ESTIMATION METHOD, AND PROGRAM

(71) Applicant: NIPPON TELEGRAPH AND TELEPHONE CORPORATION, Tokyo (JP)

(72) Inventors: Yuma Koizumi, Tokyo (JP); Shoichiro Saito, Tokyo (JP); Noboru Harada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 233 days.

(21) Appl. No.: 17/619,200

(22) PCT Filed: Jun. 19, 2019

(86) PCT No.: PCT/JP2019/024312
§ 371 (c)(1),
(2) Date: Dec. 14, 2021

(87) PCT Pub. No.: WO2020/255299
PCT Pub. Date: Dec. 24, 2020

(65) Prior Publication Data
US 2022/0246165 A1 Aug. 4, 2022

(51) Int. Cl.
*G10L 25/51* (2013.01)
*G06F 17/18* (2006.01)

(52) U.S. Cl.
CPC ............. *G10L 25/51* (2013.01); *G06F 17/18* (2013.01)

(58) Field of Classification Search
CPC ................................ G10L 25/51; G06F 17/18
See application file for complete search history.

(56) References Cited

U.S. PATENT DOCUMENTS

| | | | |
|---|---|---|---|
| 2014/0046878 A1* | 2/2014 | Lecomte | G06F 18/23213 706/12 |
| 2016/0300126 A1* | 10/2016 | Callan | G06F 18/29 |
| 2019/0120719 A1* | 4/2019 | Koizumi | G10L 25/48 |
| 2019/0192110 A1* | 6/2019 | Parvaneh | A61B 5/725 |
| 2020/0251127 A1* | 8/2020 | Kawaguchi | G10L 25/51 |
| 2020/0409653 A1* | 12/2020 | Das | G06N 3/08 |
| 2022/0032979 A1* | 2/2022 | Sivalingam | B61L 27/70 |

FOREIGN PATENT DOCUMENTS

WO   WO-2017171051 A1 * 10/2017 ............. G01H 17/00

OTHER PUBLICATIONS

Koizumi et al., "Unsupervised Detection of Anomalous Sound based on Deep Learning and the Neyman-Pearson Lemma," IEEE/ACM Transactions on Audio, Speech, and Language Processing, vol. 27-1, pp. 212-224, Jan. 2019.

* cited by examiner

*Primary Examiner* — Daniel R Sellers (57) ABSTRACT

Provided is an abnormality estimation device capable of appropriately determining normal data appearing less frequently as normal. The abnormality estimation device includes an estimation unit that estimates an anomaly degree of an acoustic signal, by using an abnormality estimation model that is optimized while using a set of normal sounds and is optimized so as to minimize a difference between an anomaly degree of a normal sound appearing more frequently and an anomaly degree of a normal sound appearing less frequently.

11 Claims, 5 Drawing Sheets

ABNORMALITY ESTIMATION DEVICE, ABNORMALITY ESTIMATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/024312, filed on 19 Jun. 2019, the disclosure of which is hereby incorporated herein by reference in its entirety.

TECHNICAL FIELD

The present invention is related to unsupervised anomaly detection and is related to an abnormality estimation device, an abnormality estimation method, and a program.

BACKGROUND ART

Unsupervised Anomaly Detection

Unsupervised anomaly detection is a problem where it is determined whether an observation vector $x \in R^D$ is normal data or anomalous data. In this situation, the observation vector x may be a sound spectrum or an image.

As a method for implementing unsupervised anomaly detection, there is a method by which the subject is determined as anomalous when a value of a function $A_\theta(x)$ exceeds a threshold value $\varphi$, the function $A_\theta(x)$ having the parameter $\theta$ and being used for calculating an index (called "a degree of anomaly" or simply, "an anomaly degree") that expresses "a likelihood of being anomalous" of x.

The abovementioned determination method can be expressed by using the following expression:

$$\text{Recognition result} = H(A_\theta(x) - \varphi) \quad (1)$$

where H( ) is a step function that returns 1 when the argument is not negative and returns 0 when the argument is negative. In other words, a device using this method determines that the observation is anomalous when the recognition result is 1 and determines that the observation is normal when the recognition result is 0, by using Expression (1). This method is used in Non-Patent Literature 1, for example.

In unsupervised anomaly detection, it is often the case that anomalous data is not available in advance, although there is a sufficient amount of normal data. To cope with this situation, the anomaly degree is defined as "deviation from the likelihood of being normal" of x, instead of the "likelihood of being anomalous" of x. Further, when the "likelihood of being normal" is expressed with a generative probability (i.e., a likelihood value) of x, it is possible to express the deviation from the likelihood of being normal of x, by using a negative logarithmic likelihood (i.e., an information amount) of the generative probability of x, for example. Accordingly, while using a generative model $q_\theta(x)$ of x that has the parameter $\theta$ estimated with a certain method, it is possible to define an anomaly degree as presented below:

$$A_\theta(x) = -\ln q_\theta(x) \quad (2)$$

With this definition, because $q_\theta(x)$ can be trained so as to shorten the distance thereof from a true generative model of x expressed as $p(x)$, it is possible to optimize $\theta$ so as to minimize the Kullback-Leibler divergence (KL divergence) presented below:

[Math. 1]
$$J_\theta = -\int p(x) \ln q_\theta(x) dx \quad (3)$$

In this situation, by approximating an expected value with an average value of training data $\{X_n\}^N_{n=1}$ and further using Expression (2) defining the anomaly degree, it is possible to express $J_\theta$ as presented below:

[Math. 2]
$$J_\theta = \int p(x) A_\theta(x) dx \quad (4)$$
$$\approx \frac{1}{N} \sum_{n=1}^{N} A_\theta(x_n) \quad (5)$$

CITATION LIST

Non-Patent Literature

Non-Patent Literature 1: Y. Koizumi, S. Saito, H. Uematsu, Y. Kawachi, and N. Harada, "Unsupervised Detection of Anomalous Sound based on Deep Learning and the Neyman-Pearson Lemma," IEEE/ACM Transactions on Audio, Speech, and Language Processing, Vol. 27-1, pp. 212-224, 2019.1

SUMMARY OF THE INVENTION

Technical Problem

The conventional unsupervised anomaly detection has a problem where, because the negative logarithmic likelihood is used, an event (called a false positive) often occurs in which the anomaly degree of normal data appearing less frequently is estimated to be high, and the normal data appearing less frequently is thus determined as anomalous.

In view of the above problem, it is an object of the present invention to provide an abnormality estimation device capable of appropriately determining normal data appearing less frequently as normal.

Means for Solving the Problem

An abnormality estimation device of the present invention is an abnormality estimation device that estimates an anomaly degree of an acoustic signal being input and includes an estimation unit that estimates the anomaly degree of the acoustic signal, by using an abnormality estimation model that is optimized while using a set of normal sounds and is optimized so as to minimize a difference between an anomaly degree of a normal sound appearing more frequently and an anomaly degree of a normal sound appearing less frequently.

Effects of the Invention

By using the abnormality estimation device of the present invention, it is possible to appropriately determine the normal data appearing less frequently as normal.

DESCRIPTION OF EMBODIMENTS

Embodiments of the present invention will be explained in detail below. Some of the constituent elements that have the same function as each other will be referred to by using the same reference numeral, and the duplicate explanations thereof will be omitted.

Preliminary Study

Let us discuss a certain kind of time-series data as data subject to an anomaly determination process. In other words, let us discuss anomaly detection using input data $X \in R^{D^X}_T = (x_1, \ldots, x_T)$ obtained by systemizing $x \in R^D$. A specific example may be audio data or video data to which a time-frequency expression is applied, for example. Similarly to Expression (2), it is possible to define an anomaly degree of the time-series data as presented below:

$$A_\theta(X) = -\ln q_\theta(X) \tag{6}$$

When T is variable, it is difficult to directly define $q_\theta(X)$. However, using a chain rule of probability gives us the following expression:

[Math. 3]

$$A_\theta(X) = -\ln q_0(x_1) - \sum_{t=2}^{T} \ln q_\theta(x_t \mid x_{1,\ldots,t-1}) \tag{7}$$

This format, however, is not practical because it is necessary to estimate/hold all of as many conditional distributions as T, in order to calculate the anomaly degree.

In anomalous sound detection, a method is often used by which X is determined as anomalous if at least one sample among $x_1, \ldots, x_T$ exceeds the threshold value $\varphi$. This method is equivalent to defining the anomaly degree as presented below:

[Math. 4]

$$A_\theta(X) = \max_t -\ln q_0(x_t) \tag{8}$$

$$= \max_t A_\theta(x_t) \tag{9}$$

The above definition of the anomaly degree, however, has the following problem: When $A_\theta(x)$ is trained through the KL divergence minimization shown in Expression (5), $A_\theta(X)$ expresses an information amount of a sample having the lowest generative probability among the series. For example, when Japanese speech is used as an example, although vowels such as "a" and "i" occur more frequently, consonants such as "w" and "p" occur less frequently. According to the definition of the anomaly degree based on the maximum information amount in Expression (9), when an utterance contains consonants that occur less frequently, the anomaly degree would be higher even though the speech is normal. For this reason, there would be high occurrence of false positives where normalcy is erroneously determined as anomalous. As an intuitive method for solving this problem, there is a method by which $\theta$ is trained so as to minimize the maximum information amount in Expression (9).

[Math. 5]

$$J_\theta = \max_n A_\theta(x_n) \tag{10}$$

In Expression (10), although $A_\theta(x)$ no longer expresses an information amount, it is possible to train $\theta$ while directly minimizing the anomaly degree of normal data. However, when we imagine training $\theta$ through a method such as a stochastic gradient method, although Expression (5) allows using N samples for calculating one gradient, Expression (10) allows using only one sample for calculating one gradient. For this reason, there is a possibility that the gradient calculation may be unstable, which makes this method, too, not practical.

A method Adopted in an Embodiment

To cope with the situations described above, we propose an anomaly degree by which Expression (9) is minimized with respect to any normal data. Let us assume that U denotes a uniform distribution having a constant probability density with a set of normal sounds $\{x \mid p(x) > 0\}$ and having no density in the other regions. Among probability distributions each having a probability density in an arbitrary region, probability distributions that minimize a maximum information amount are uniform distributions. Accordingly, $A_\theta(x)$ shall be trained so as to minimize the objective function presented below:

[Math. 6]

$$J_\theta = \int U(x) A_\theta(x) dx \tag{11}$$

Although it would be desirable to transform Expression (11) so that optimization is possible from training data, because the training data $\{x_n\}_{n=1}^{N}$ is obtained from the true probability distribution $p(x)$, it is impossible to approximate Expression (11) with an average value of the training data.

Incidentally, because U is a function that gives {x|p(x)>0} the constant probability density, Expression (11) is in proportion to the expression presented below:

[Math. 7]

$$J_\theta \propto \int p(x) \cdot \frac{1}{p(x)} A_\theta(x) dx \quad (12)$$

Because Expression (12) is expressed in the form of an expected value with respect to p(x), it is possible to approximate Expression (12) by using an average value of the training data as presented below:

[Math. 8]

$$J_\theta \approx \frac{1}{N} \sum_{n=1}^{N} \frac{1}{p(x_n)} A_\theta(x_n) \quad (13)$$

In other words, it is possible to design the abnormality estimation model $A_\theta(x)$ that outputs an anomaly degree by which Expression (9) is minimized, by applying a larger weight to normal data "appearing less frequently" which has a lower probability of being present among the training data and minimizing an average value of weighted anomaly degrees.

An Implementation using Kernel Density Estimation

However, because the true distribution p(x) is unknown, it is necessary to estimate the weight 1/p(x) somehow. In the present example, we shall discuss an estimation method using kernel density estimation. Kernel density estimation is a non-parametric density estimation method by which p(x) is calculated from the training data $\{x_n\}^N_{n=1}$. It is possible to express a method using a Gaussian kernel, which is most commonly used, as presented below:

[Math. 9]

$$p(x_n) \approx K(x_n) = \frac{1}{N} \sum_{j=1}^{N} \exp\{-\lambda \|x_n - x_j\|_2^2\} \quad (14)$$

In the above expression, λ denotes a bandwidth parameter. On the assumption that $\{x_n\}^N_{n=1}$ is normalized in advance to have a mean of 0 and a variance of 1, setting approximately $\lambda=(2D)^{-1}$ will be satisfactory. In that situation, it is possible to approximate Expression (13) as presented below:

[Math. 10]

$$J_\theta = \frac{1}{\sum_{n=1}^{N} w_n} \sum_{n=1}^{N} w_n A_\theta(x_n) \quad (15)$$

$$w_n = \frac{1}{K(x_n) + \varepsilon} \quad (16)$$

In the above expression, ε denotes a positive constant used for avoiding zero division and may be set to a value around $10^{-5}$.

A Simple Implementation using the Anomaly Degree

Because the weight calculation in Expression (16) is based on the kernel density estimation, the calculation amount and the memory consumption may be huge. To avoid this problem, it is also possible to approximately apply a weight as a reciprocal of the anomaly degree.

For example, an implementation as presented below is possible:

[Math. 11]

$$w_n = \exp\left(\frac{A_\theta(x_n)}{\max[A_\theta(x_j)]_j}\right) \quad (17)$$

Although the above expression is not realization of Expression (11), similar advantageous effects are expected because the weight is applied to proactively decrease anomaly degrees of samples having prominent anomaly degrees.

Other Modification Examples

We have so far discussed modifying the cost function in the form shown in Expression (5). Alternatively, it is also possible to adopt other cost functions. For example, let us discuss a situation where anomalous data $\{y_m\}^M_{m=1}$ has been obtained from actual measured values or through a simulation, in addition to the normal data $\{x_n\}^N_{n=1}$. In that situation, it is possible to use, for example, a cost function as presented below:

[Math. 12]

$$J_\theta = \underbrace{\frac{1}{N} \sum_{n=1}^{N} A_\theta(x_n)}_{*} - \frac{1}{M} \sum_{m=1}^{M} \lambda \cdot \tanh(A_\theta(y_m)/\lambda) \quad (18)$$

In this situation, the portion (the first term) of the expression marked with "*" shall be modified. For example, the first term of the above expression may be changed to Expression (15). In other words, to calculate an average value of the normal data as a value obtained by applying a certain weight to the anomaly degree, it is possible to design the weight so that a larger weight is applied to normal data "appearing less frequently" which has a lower probability of being present among the training data.

First Embodiment

In a first embodiment, an abnormality estimation model training device will be disclosed which uses the "Method adopted in an embodiment" for minimizing a maximum value of the anomaly degree of the normal data, so as to apply a larger weight to normal data "appearing less frequently" which has a lower probability of being present among the training data $\{x_n\}^N_{n=1}$ and to further minimize an average value of weighted anomaly degrees.

An Abnormality Estimation Model Training Device

Figure 1:
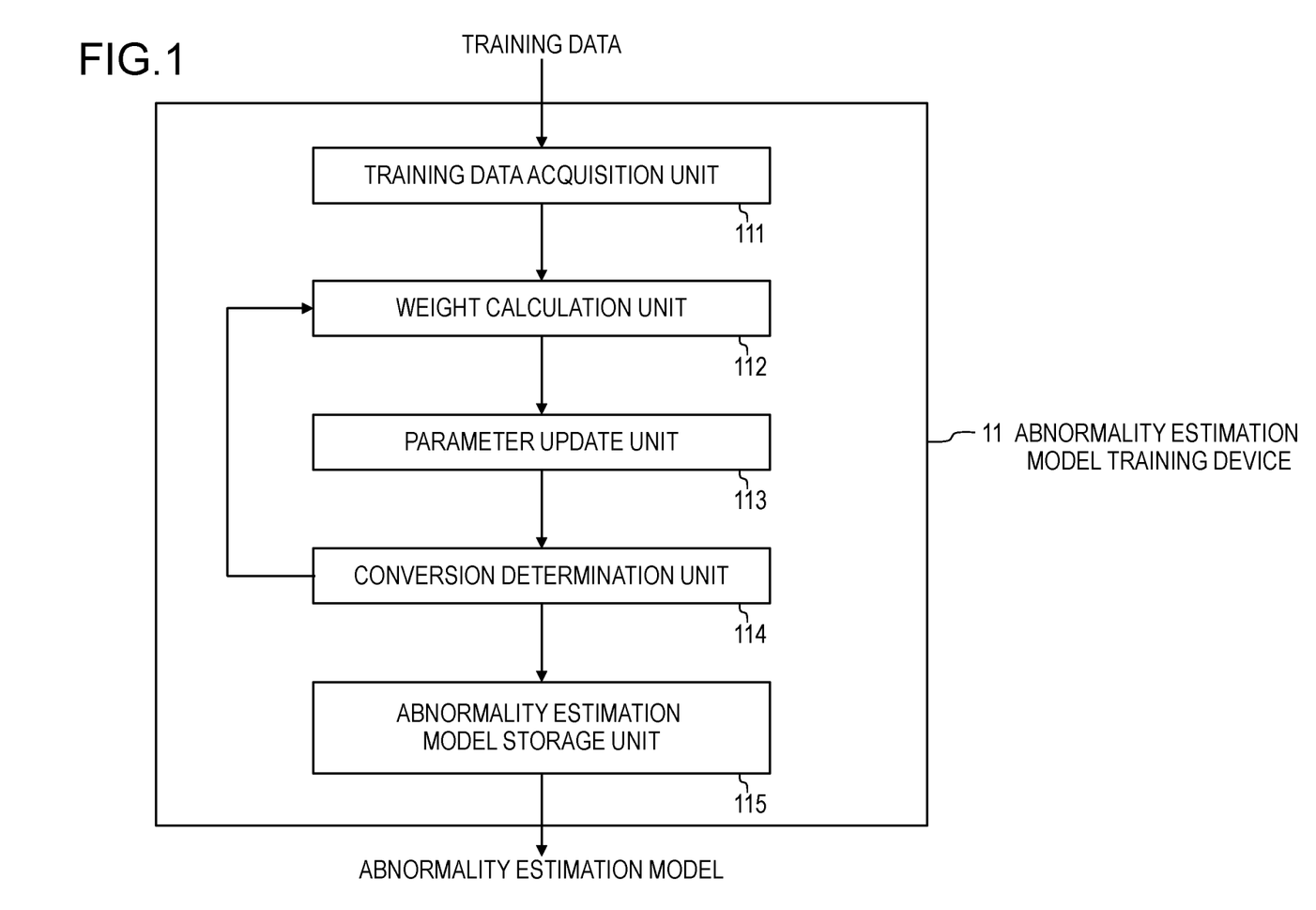
FIG. 1 is a block diagram showing a configuration of an abnormality estimation model training device of a first embodiment.

Next, a configuration of an abnormality estimation model training device 11 according to the first embodiment will be explained, with reference to FIG. 1. As shown in the drawing, the abnormality estimation model training device 11 of the present embodiment includes a training data acquisition unit 111, a weight calculation unit 112, a parameter update unit 113, a convergence determination unit 114, and an abnormality estimation model storage unit 115. In the following sections, operations of the constituent elements will be explained in detail, with reference to FIG. 2.

The Training Data Acquisition Unit 111

Figure 2:
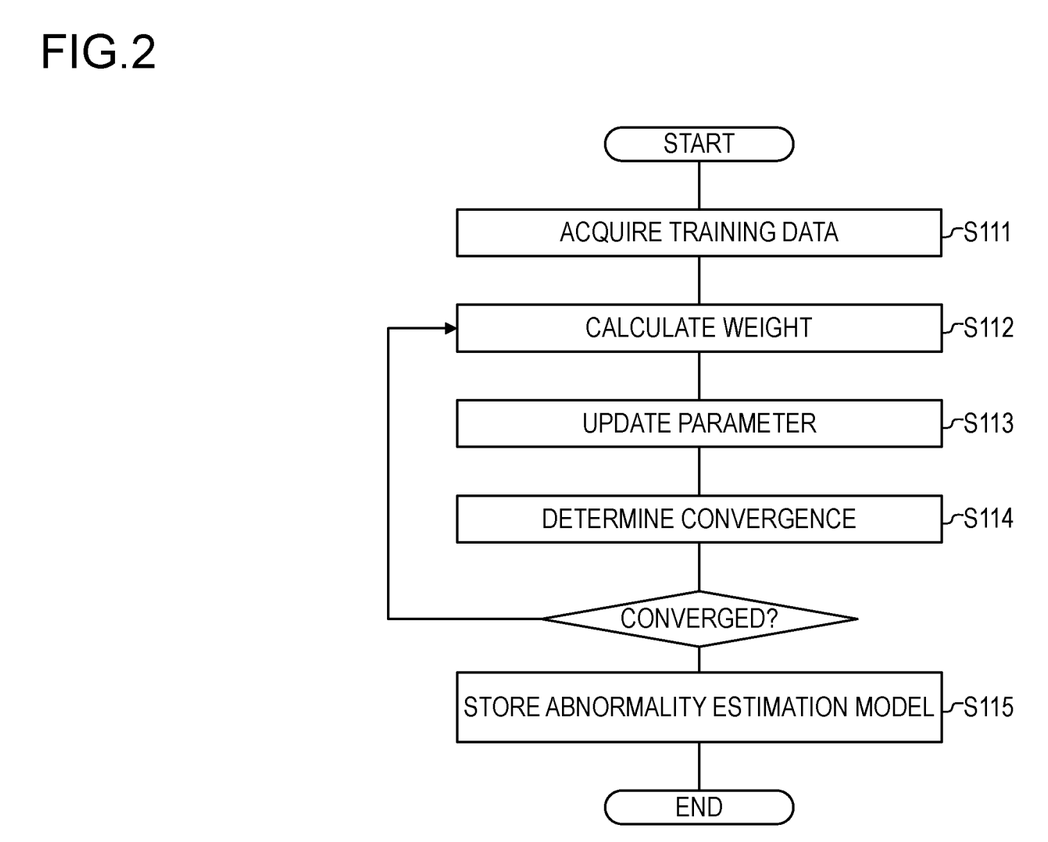
FIG. 2 is a flowchart showing an operation of the abnormality estimation model training device of the first embodiment.

The training data acquisition unit 111 acquires the normal data $\{x_n\}_{n=1}^{N}$ and, if necessary, supplemental data such as the anomalous data $\{y_m\}_{m=1}^{M}$ (S111). The data may be an acoustic signal or the like, for example. However, the data handled in the present example is not limited to audio-based data and may be data in general containing normal data and anomalous data. The data may be image data, for example.

The Weight Calculation Unit 112

The weight calculation unit 112 calculates a weight so as to apply a larger weight to normal data "appearing less frequently" which has a lower probability of being present among the training data (S112). More specifically, see below:

[Math. 13]

$$J_\theta \propto \int p(x) \cdot \frac{1}{p(x)} A_\theta(x) dx \quad (12)$$

$$J_\theta \approx \frac{1}{N} \sum_{n=1}^{N} \frac{1}{p(x_n)} A_\theta(x_n) \quad (13)$$

As mentioned earlier in the explanation of the expressions presented above, when the reciprocal of the true probability distribution $p(x)$ is adopted as the weight, a weight is applied to x appearing less frequently (i.e., $p(x)$ is a smaller value) by using $1/p(x)$, which is the reciprocal thereof and is therefore a larger value. Accordingly, it is possible to apply a larger weight to the normal data "appearing less frequently". As mentioned earlier, because the true distribution $p(x)$ is unknown, the weight calculation unit 112 estimates the true distribution $p(x)$ by using kernel density estimation, for example.

[Math. 14]

$$J_\theta = \frac{1}{\sum_{n=1}^{N} w_n} \sum_{n=1}^{N} w_n A_\theta(x_n) \quad (15)$$

$$w_n = \frac{1}{K(x_n) + \varepsilon} \quad (16)$$

The symbol $w_n$ in the above expressions is calculated as the weight. Alternatively, the weight calculation unit 112 may calculate the weight by using the expression presented below:

[Math. 15]

$$w_n = \exp\left(\frac{A_\theta(x_n)}{\max[A_\theta(x_j)]_j}\right) \quad (17)$$

The Parameter Update Unit 113

The parameter update unit 113 updates the parameter $\theta$ so as to keep small the value of the cost function $J_\theta$ using the weight calculated at step S112 (S113).

The Convergence Determination Unit 114

The convergence determination unit 114 determines whether the value of the cost function Jo has converged, and if the value has not converged, the process returns to step S112. As a rule for determining the convergence, it is possible to question whether step S113 has repeatedly been performed a certain number of times (e.g., 100,000 times). Performing step S113 repeatedly until the convergence is achieved is the same as calculating the parameter $\theta$ by using $\theta \leftarrow \text{argmin}_\theta J_\theta$, which can be explained as follows.

[Math. 16]

$$J_\theta = \int U(x) A_\theta(x) dx \quad (11)$$

When the objective function Jo is expressed as presented above, $\theta \leftarrow \text{argmin}_\theta J_\theta$ is the same as calculating the parameter $\theta$ so as to minimize the objective function $J_\theta$, as explained earlier.

As explained earlier, for example, it is possible to approximate the objective function $J_\theta$ as presented below:

[Math. 17]

$$J_\theta \approx \frac{1}{N} \sum_{n=1}^{N} \frac{1}{p(x_n)} A_\theta(x_n) \quad (13)$$

It is possible to approximate $p(x_n)$ by using the kernel density estimation as presented below:

[Math. 18]

$$p(x_n) \approx K(x_n) = \frac{1}{N} \sum_{j=1}^{N} \exp\{-\lambda \|x_n - x_j\|_2^2\} \quad (14)$$

It is possible to approximate the objective function Jo and the weight $w_n$ as presented below:

[Math. 19]

$$J_\theta = \frac{1}{\sum_{n=1}^{N} w_n} \sum_{n=1}^{N} w_n A_\theta(x_n) \quad (15)$$

$$w_n = \frac{1}{K(x_n) + \varepsilon} \quad (16)$$

The parameter θ shall then be calculated so as to minimize the approximated objective function $J_\theta$.

Alternatively, as mentioned earlier, it is also possible to calculate the weight $w_n$ as presented below:

[Math. 20]

$$w_n = \exp\left(\frac{A_\theta(x_n)}{\max[A_\theta(x_j)]_j}\right) \quad (17)$$

The Abnormality Estimation Model Storage Unit 115

The abnormality estimation model storage unit 115 stores therein the parameter θ converged at step S114 and the abnormality estimation model $A_\theta(x)$ (S115).

In this situation, at steps S112 and S114, all the data may be used. Alternatively, it is also acceptable to use a method such as a stochastic gradient method by which only a part of all the samples is used. Further, to design the abnormality estimation model $A_\theta(x)$, an autoencoder or the like may be used, as described in Non-Patent Literature 1.

An Abnormality Estimation Device

Figure 3:
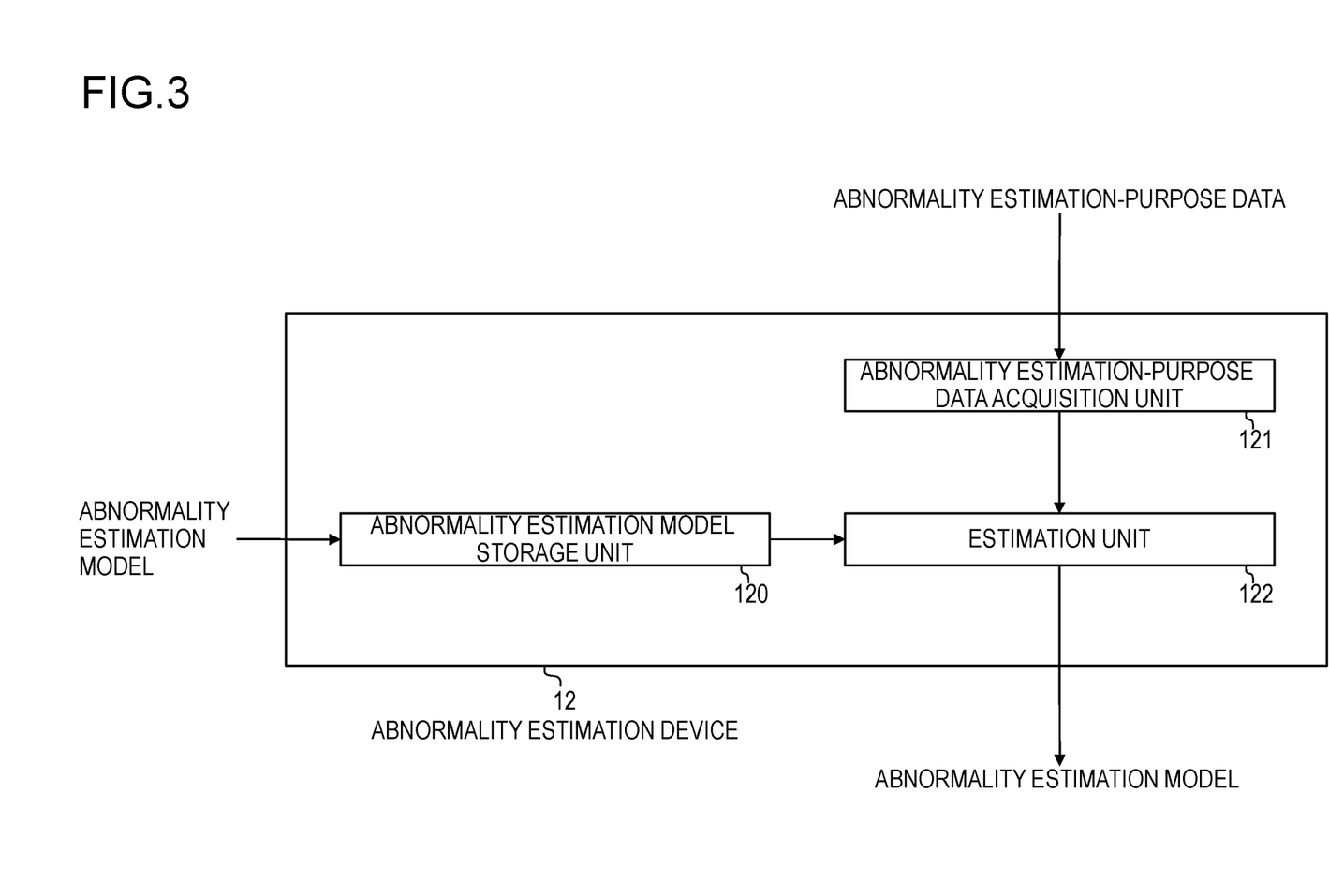
FIG. 3 is a block diagram showing a configuration of an abnormality estimation device of the first embodiment.

Next, a configuration of an abnormality estimation device 12 according to the first embodiment will be explained, with reference to FIG. 3. As shown in the drawing, the abnormality estimation device 12 according to the present embodiment includes an abnormality estimation model storage unit 120, an abnormality estimation-purpose data acquisition unit 121, and an estimation unit 122. In the following sections, operations of the constituent elements will be explained in detail, with reference to FIG. 4.

The Abnormality Estimation Model Storage Unit 120

The abnormality estimation model storage unit 120 stores therein, in advance, the abnormality estimation model $A_\theta(x)$ trained (optimized) by the abnormality estimation model training device 11.

The Abnormality Estimation-Purpose Data Acquisition Unit 121

Figure 4:
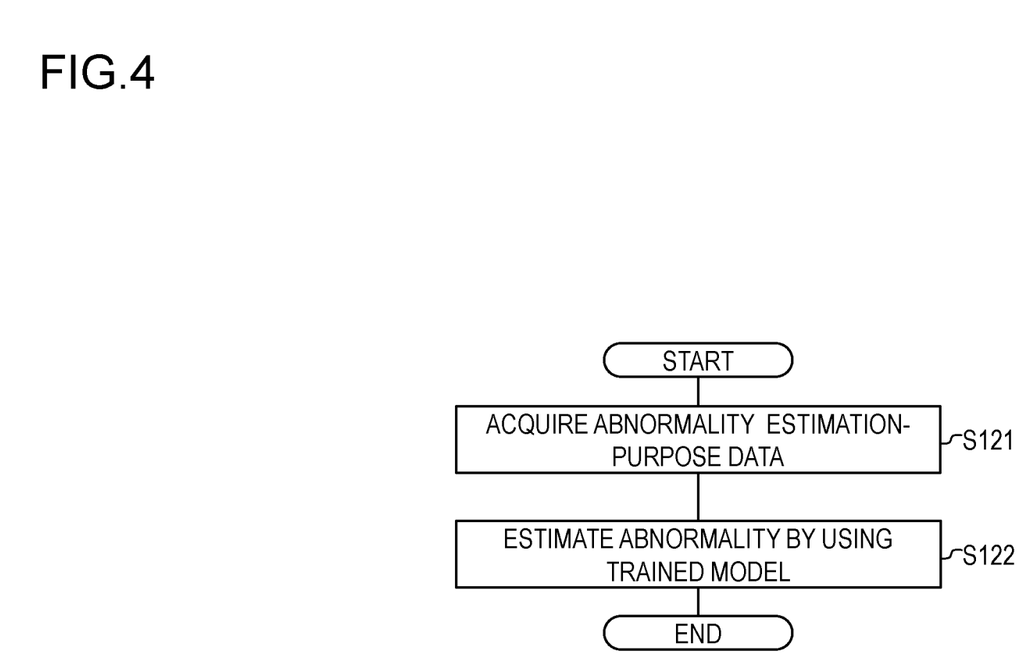
FIG. 4 is a flowchart showing an operation of the abnormality estimation device of the first embodiment.

The abnormality estimation-purpose data acquisition unit 121 acquires abnormality estimation-purpose data (S121). The data may be an acoustic signal, for example. However, the data handled in the present example is not limited to audio-based data and may be data in general containing normal data and anomalous data. The data may be image data, for example.

The Estimation Unit 122

By using the model that was trained (estimated) by the abnormality estimation model training device 11 and stored, in advance, in the abnormality estimation model storage unit 120, the estimation unit 122 estimates an anomaly degree of the abovementioned data (e.g., the acoustic signal) (S122).

The abnormality estimation model used at step S122 is, as explained above, a model that has been trained (optimized) so as to minimize the difference between the anomaly degree of normal data (a normal sound) appearing more frequently and the anomaly degree of normal data (a normal sound) appearing less frequently.

More specifically, the abnormality estimation model used at step S122 is trained (optimized) by applying a larger weight to the normal data (a normal sound) appearing less frequently among the set of normal data (normal sounds) than to the normal data (a normal sound) appearing more frequently.

More specifically, the abnormality estimation model $A_\theta(x)$ used at step S122 is trained (optimized) so as to minimize the objective function $J_\theta$ expressed with the KL divergence presented below, which uses the uniform distribution U(x) having the constant probability density with the set of normal sounds $\{x|p(x)>0\}$ and having no density in the other regions.

[Math. 21]

$$J_\theta = \int U(x)A_\theta(x)dx \quad (11)$$

Further, while a true generative model of the observation vector x is expressed as p(x), and n=1, ... N where N is an integer of 2 or larger, it is possible to approximate the objective function $J_\theta$ as presented below:

[Math. 22]

$$J_\theta \approx \frac{1}{N}\sum_{n=1}^{N}\frac{1}{p(x_n)}A_\theta(x_n) \quad (13)$$

While j=1, ... N, and when λ denotes a bandwidth parameter, it is possible to approximate $p(x_n)$ by using the kernel density estimation as presented below:

[Math. 23]

$$p(x_n) \approx K(x_n) = \frac{1}{N}\sum_{j=1}^{N}\exp\{-\lambda\|x_n - x_j\|_2^2\} \quad (14)$$

It is possible to approximate the objective function Jo and the weight $w_n$ and as presented below, where ε denotes a positive constant to avoid zero division:

[Math. 24]

$$J_\theta = \frac{1}{\sum_{n=1}^{N}w_n}\sum_{n=1}^{N}w_n A_\theta(x_n) \quad (15)$$

$$w_n = \frac{1}{K(x_n)+\varepsilon} \quad (16)$$

The model is then trained (optimized) so as to minimize the approximated objective function $J_\theta$.

Alternatively, as mentioned earlier, it is also possible to calculate the weight $w_n$ as presented below:

[Math. 25]

$$w_n = \exp\left(\frac{A_\theta(x_n)}{\max[A_\theta(x_j)]_j}\right) \quad (17)$$

Advantageous Effects

By using the abnormality estimation model training device 11 according to the first embodiment, at the time of constructing the anomaly detection system related to series data, it is possible to train the abnormality estimation model $A_\theta(x)$ so as to decrease false positives where normalcy is erroneously determined as anomalous. Consequently, by using the abnormality estimation device 12 according to the first embodiment, it is possible to appropriately determine the normal data appearing less frequently as normal.

Additional Remarks

As a single hardware entity, for example, the device of the present invention includes: an input unit to which a keyboard or the like may be connected; an output unit to which a liquid crystal display device or the like may be connected; a communication unit to which a communication device (e.g., a communication cable) capable of communicating with the outside of the hardware entity may be connected; a CPU (Central Processing Unit, which may include a cache memory, a register, and the like); a RAM and a ROM serving as memories; an external storage device realized with a hard disk; and a bus connecting the input unit, the output unit, the communication unit, the CPU, the RAM, the ROM, and the external storage device together so that data can be exchanged therebetween. Further, as necessary, the hardware entity may be provided with a device (a drive) capable of writing to and reading from a recording medium such as a CD-ROM. Examples of a physical entity provided with these hardware resources include a general-purpose computer.

The external storage device of the hardware entity has stored therein programs that are necessary for realizing the abovementioned functions and data that is necessary for processing the programs. (The programs do not necessarily have to be stored in the external storage device and may be stored in a ROM serving as a read-only storage device.) Further, the data obtained by processing these programs is stored into a RAM or an external storage device, as appropriate.

In the hardware entity, the programs stored in the external storage device (or the ROM or the like) and the data that is necessary for processing the programs are read into a memory as necessary, so that the CPU interprets, executes, and processes the programs and the data, as appropriate. As a result, the CPU realizes the prescribed functions (i.e., the constituent elements described above as . . . units or . . . means).

The present invention is not limited to the embodiments described above and may be modified as appropriate without departing from the scope of the present invention. Further, the processes described in the above embodiments do not necessarily have to be performed in a time series according to the described order, but may be performed in parallel or individually, in accordance with the processing capability of the device that executes the processes or when necessary.

As explained earlier, when a computer realizes the processing functions of the hardware entity (the device of the present invention) described in the above embodiments, the processing content of the functions included in the hardware entity are described in the programs. Further, as a result of the computer executing the programs, the processing functions of the hardware entity are realized by the computer.

Figure 5:
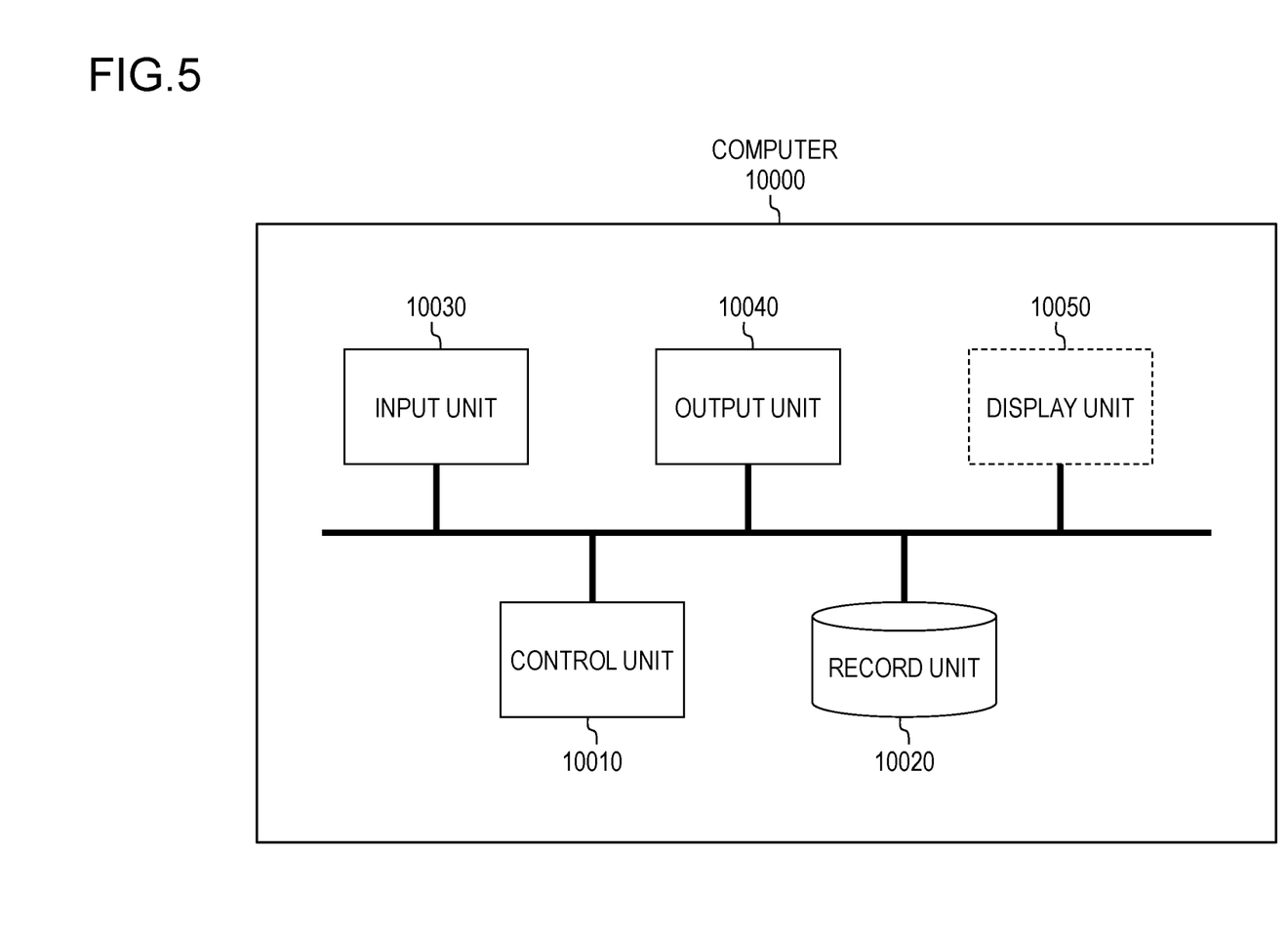
FIG. 5 is a drawing showing an example of a functional configuration of a computer.

It is possible to perform the various types of processes described above, by causing a record unit 10020 of the computer shown in FIG. 5 to read a program that executes the steps in the abovementioned method, so as to bring a control unit 10010, an input unit 10030, an output unit 10040, and the like into operation.

The program describing the processing content may be recorded on a computer-readable recording medium. The computer-readable recording medium may be of any type, such as a magnetic recording device, an optical disc, an opto-magnetic recording medium, or a semiconductor memory, for example. More specifically, examples of the magnetic recording device include a hard disk device, a flexible disc, and a magnetic tape. Examples of the optical disc include a Digital Versatile Disc (DVD), a Digital Versatile Disc Random Access Memory (DVD-RAM), a Compact Disc Read-Only Memory (CD-ROM), a Compact Disc Recordable/ReWritable (CD-R/RW). Examples of the opto-magnetic recording medium include a Magneto-Optical (MO) disc. Examples of the semiconductor memory include an Electronically Erasable and Programmable Read-Only Memory (EEP-ROM).

Further, the program may be distributed, for example, by selling, transferring, or lending a portable recording medium (e.g., a DVD or a CD-ROM) that has the program recorded thereon. Further, it is also acceptable to distribute the program by storing the program in a storage device of a server computer and transferring the program from the server computer to another computer via a network.

For example, the computer that executes the program, at first, temporarily stores the program recorded on the portable recording medium or transferred from the server computer, into a storage device of its own. After that, when performing the processes, the computer reads the program stored in the recording medium thereof and executes the processes according to the read program. Further, in another execution mode of the program, the computer may directly read the program from the portable recording medium, so as to execute the processes according to the program. Alternatively, every time the program is transferred to the computer from the server computer, the processes may be executed according to the received program on each occasion. In yet another example, without transferring the program from the server computer to the computer, it is acceptable to execute the abovementioned processes by using an Application Service Provider (ASP) service where the processing functions are realized simply by instructing the execution and obtaining the results. Further, the program in the present embodiments include information that is equivalent to a program and serves for use in processes performed by electronic computation devices (e.g., data that is not direct commands for computers but has the characteristic of regulating processes performed by computers).

Further, in the present embodiment, the hardware entity is structured by causing the computer to execute the prescribed program. However, another arrangement is also acceptable in which at least a part of the processing content is realized in the manner of hardware.

The invention claimed is:

1. An abnormality estimation device that estimates an anomaly degree of an acoustic signal being input, comprising:
processing circuitry configured to
estimate the anomaly degree of the acoustic signal, by using an abnormality estimation model that is optimized while using a set of normal sounds and is optimized so as to minimize a difference between an anomaly degree of a normal sound appearing more frequently and an anomaly degree of a normal sound appearing less frequently, wherein the set of normal sounds comprises the normal sound appearing more frequently and the normal sound appearing less frequently, wherein
the abnormality estimation model is trained by applying a larger weight to the normal sound appearing less frequently among the set of normal sounds than to the normal sound appearing more frequently thereby reducing false positives.

2. The abnormality estimation device according to claim 1, wherein
while $U(x)$ expresses a uniform distribution having a constant probability density with the set of normal sounds and having no density in other regions, whereas $A_\theta(x)$ expresses an abnormality estimation model to calculate a likelihood of an observation vector x being anomalous by using a parameter $\theta$, the processing circuitry estimates the anomaly degree of the acoustic signal, by using the abnormality estimation model $A_\theta(x)$ optimized so as to minimize an objective function $J_\theta$ expressed as

[Math. 26]

$$J_\theta = \int U(x) A_\theta(x) dx.$$

3. The abnormality estimation device according to claim 2, wherein the anomaly degree of the acoustic signal is estimated by:
approximating the objective function $J_\theta$ as

[Math. 27]

$$J_\theta \approx \frac{1}{N} \sum_{n=1}^{N} \frac{1}{p(x_n)} A_\theta(x_n)$$

where a true generative model of the observation vector x is expressed as $p(x)$, and $n=1, \ldots, N$ while N is an integer of 2 or larger;
approximating $p(x_n)$ by using kernel density estimation as

[Math. 28]

$$p(x)_n \approx K(x_n) = \frac{1}{N} \sum_{j=1}^{N} \exp\{-\lambda \|x_a - x_j\|_2^2\}$$

where $j=1, \ldots, N$, while $\lambda$ denotes a bandwidth parameter;

approximating the objective function $J_\theta$ and a weight $w_n$ as

[Math. 29]

$$J_\theta = \frac{1}{\sum_{n=1}^{N} w_n} \sum_{n=1}^{N} w_n A_\theta(x_n)$$

$$w_n = \frac{1}{K(x_n) + \varepsilon}$$

where $\varepsilon$ is a positive constant to avoid zero division; and
using the abnormality estimation model $A_\theta(x)$ optimized so as to minimize the approximated objective function $J_\theta$.

4. The abnormality estimation device according to claim 3, wherein the weight $w_n$ is calculated as

[Math. 30]

$$w_n = \exp\left(\frac{A_\theta(x_n)}{\max[A_\theta(x_j)]_j}\right).$$

5. A non-transitory computer readable medium that stores a program that causes a computer to function as the abnormality estimation device according to claim 4.

6. A non-transitory computer readable medium that stores a program that causes a computer to function as the abnormality estimation device according to claim 3.

7. A non-transitory computer readable medium that stores a program that causes a computer to function as the abnormality estimation device according to claim 2.

8. A non-transitory computer readable medium that stores a program that causes a computer to function as the abnormality estimation device according to claim 1.

9. An abnormality estimation device that estimates an anomaly degree of data being input, comprising:
processing circuitry configured to
estimate the anomaly degree of the data, by using an abnormality estimation model that is optimized while using a set of pieces of normal data and is optimized so as to minimize a difference between an anomaly degree of a piece of normal data appearing more frequently and an anomaly degree of a piece of normal data appearing less frequently, wherein the piece of normal data comprises the piece of normal data appearing more frequently and the piece of normal data appearing less frequently, wherein
the abnormality estimation model is trained by applying a larger weight to the piece of normal data appearing less frequently among the set of pieces of normal data than to the piece of normal data appearing more frequently thereby reducing false positives.

10. A non-transitory computer readable medium that stores a program that causes a computer to function as the abnormality estimation device according to claim 9.

11. An abnormality estimation method for estimating an anomaly degree of an acoustic signal being input, comprising:
a step of estimating the anomaly degree of the acoustic signal, by using an abnormality estimation model that is optimized while using a set of normal sounds and is optimized so as to minimize a difference between an anomaly degree of a normal sound appearing more frequently and an anomaly degree of a normal sound appearing less frequently, wherein the set of normal sounds comprises the normal sound appearing more frequently and the normal sound appearing less frequently, wherein
the abnormality estimation model is trained by applying a larger weight to the normal sound appearing less frequently among the set of normal sounds than to the normal sound appearing more frequently thereby reducing false positives.

* * * * *

UNITED STATES PATENT AND TRADEMARK OFFICE
CERTIFICATE OF CORRECTION

PATENT NO. : 12,387,743 B2
APPLICATION NO. : 17/619200
DATED : August 12, 2025
INVENTOR(S) : Koizumi et al.

It is certified that error appears in the above-identified patent and that said Letters Patent is hereby corrected as shown below:

In the Specification

In Column 2, Lines 10 of [Math. 1], the equation reading:

$$J_\theta = -\int p(x)\ln q_0(x)\, dx \cdots (3)$$

Should read:

$$J_\theta = -\int p(x)\ln q_\theta(x)\, dx \cdots (3)$$

In Column 2, Line 21 of [Math. 2], the equation reading:

$$J_\theta = \int p(x) A_0(x) dx \cdots (4)$$
$$\approx \frac{1}{N} \sum_{n=1}^{N} A_\theta(x_n) \cdots (5)$$

Should read:

$$J_\theta = \int p(x) A_\theta(x) dx \cdots (4)$$
$$\approx \frac{1}{N} \sum_{n=1}^{N} A_\theta(x_n) \cdots (5)$$

Signed and Sealed this
Eighteenth Day of November, 2025

John A. Squires
*Director of the United States Patent and Trademark Office*

CERTIFICATE OF CORRECTION (continued)

In Column 3, Line 56 of [Math. 3], the equation reading:

$$A_\theta(X) = -\ln q_0(x_1) - \sum_{t=2}^{T} \ln q_\theta(x_t | x_{1,\ldots,t-1}) \cdots (7)$$

Should read:

$$A_\theta(X) = -\ln q_\theta(x_1) - \sum_{t=2}^{T} \ln q_\theta(x_t | x_{1,\ldots,t-1}) \cdots (7)$$

In Column 4, Line 4 of [Math. 4], the equation reading:

$$A_\theta(X) = \max_t -\ln q_0(x_t) \cdots (8)$$
$$= \max_t A_\theta(x_t) \cdots (9)$$

Should read:

$$A_\theta(X) = \max_t -\ln q_\theta(x_t) \cdots (8)$$
$$= \max_t A_\theta(x_t) \cdots (9)$$

In the Claims

Column 13, Line 39 Claim 2, of [Math. 26], the equation reading:
$J_\theta = \int U(x) A_0(x) \, dx$
Should read:
$J_\theta = \int U(x) A_\theta(x) \, dx$ Column 13, Line 50 Claim 3, of [Math. 27], the equation reading:

$$J_\theta \approx \frac{1}{N} \sum_{n=1}^{N} \frac{1}{p(x_n)} A_0(x_n)$$

Should read:

$$J_\theta \approx \frac{1}{N} \sum_{n=1}^{N} \frac{1}{p(x_n)} A_\theta(x_n)$$

CERTIFICATE OF CORRECTION (continued)
U.S. Pat. No. 12,387,743 B2

Column 13, Line 62 Claim 3, of [Math. 28], the equation reading:

$$p(x_n) \approx K(x_n) = \frac{1}{N}\sum_{j=1}^{N} \exp\left\{-\lambda \|x_a - x_j\|_2^2\right\}$$

Should read:

$$p(x_n) \approx K(x_n) = \frac{1}{N}\sum_{j=1}^{N} \exp\left\{-\lambda \|x_n - x_j\|_2^2\right\}$$